(12) United States Patent
Zhou

(10) Patent No.: US 11,656,100 B2
(45) Date of Patent: May 23, 2023

(54) ANGULAR DISPLACEMENT SENSOR

(71) Applicant: Pulse Innovation Labs, Inc., Santa Monica, CA (US)

(72) Inventor: Alec Zhou, Los Angeles, CA (US)

(73) Assignee: Pulse Innovation Labs, Inc., Santa Monica, CA (US)

( * ) Notice: Subject to any disclaimer, the term of this patent is extended or adjusted under 35 U.S.C. 154(b) by 120 days.

(21) Appl. No.: 17/313,711

(22) Filed: May 6, 2021

(65) Prior Publication Data

US 2022/0113167 A1  Apr. 14, 2022

Related U.S. Application Data

(60) Provisional application No. 63/089,421, filed on Oct. 8, 2020.

(51) Int. Cl.
*G01D 5/20* (2006.01)

(52) U.S. Cl.
CPC ..................... *G01D 5/202* (2013.01)

(58) Field of Classification Search
CPC ............... G01D 5/202; G01D 5/2053
USPC ............ 324/207.15, 207.16, 207.25
See application file for complete search history.

(56) References Cited

U.S. PATENT DOCUMENTS

| | | | | |
|---|---|---|---|---|
| 3,851,242 A | * | 11/1974 | Ellis | G01D 5/243 331/65 |
| 5,079,523 A | * | 1/1992 | Kleinhans | G01D 5/2225 324/207.16 |
| 5,521,494 A | * | 5/1996 | Hore | G01D 5/2006 324/207.16 |
| 5,903,205 A | | 5/1999 | Goto et al. | |
| 6,011,389 A | * | 1/2000 | Masreliez | G01D 5/2053 324/207.17 |
| 6,236,199 B1 | | 5/2001 | Irle et al. | |
| 6,304,076 B1 | | 10/2001 | Madni et al. | |
| 7,852,069 B2 | | 12/2010 | Kikuchi et al. | |
| 8,570,028 B2 | | 10/2013 | Ely | |
| 8,729,887 B2 | | 5/2014 | Suzuki et al. | |
| 9,194,721 B2 | * | 11/2015 | Backes | G01D 5/2291 |
| 9,652,280 B2 | | 5/2017 | Zheng et al. | |
| 10,018,654 B2 | | 7/2018 | Bertin | |
| 10,527,458 B2 | | 1/2020 | Teboulle et al. | |
| 10,557,727 B2 | | 2/2020 | Maniouloux et al. | |
| 10,564,007 B2 | | 2/2020 | Maniouloux et al. | |
| 10,564,008 B2 | | 2/2020 | Maniouloux et al. | |

(Continued)

FOREIGN PATENT DOCUMENTS

JP   2018189485 A   11/2018
WO   2016055300 A1   4/2016

*Primary Examiner* — Feba Pothen
*Assistant Examiner* — Rahul Maini
(74) *Attorney, Agent, or Firm* — Welsh Flaxman & Gitler LLC

(57) ABSTRACT

An eddy-current angular displacement sensor includes a stator including a coil array including N coils, wherein N is an integer greater than 1, one exciting circuit connected via a switching system to the coil array that generates a changing magnetic field, a measuring circuit connected via a switching system to the coil array that generates output signals that depend on the eddy currents caused by the changing magnetic field, and a partially metallized rotor, through which the eddy currents travel, and the angular displacement of which would be determined by the output signals.

15 Claims, 11 Drawing Sheets

(56) References Cited

U.S. PATENT DOCUMENTS

| | | | |
|---|---|---|---|
| 2003/0016008 A1* | 1/2003 | Christensen | G01V 3/104 |
| | | | 324/207.16 |
| 2007/0194782 A1* | 8/2007 | Lee | G01D 5/202 |
| | | | 324/207.17 |
| 2008/0164869 A1 | 7/2008 | Bach et al. | |
| 2010/0102827 A1* | 4/2010 | Schreiber | G01D 5/2013 |
| | | | 324/637 |
| 2017/0292857 A1 | 10/2017 | Leidich et al. | |
| 2018/0238714 A1* | 8/2018 | Leidich | G01D 5/2026 |

* cited by examiner

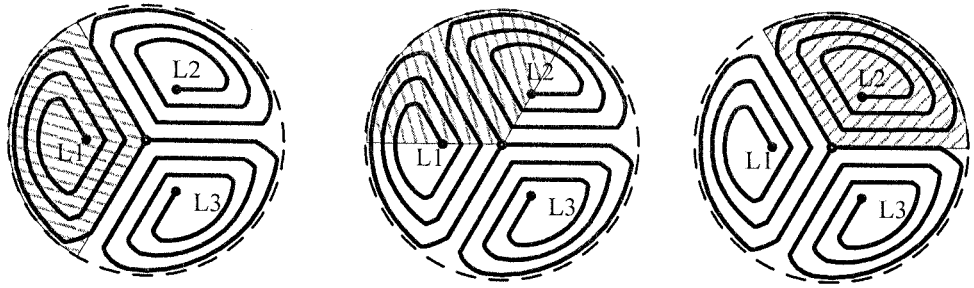
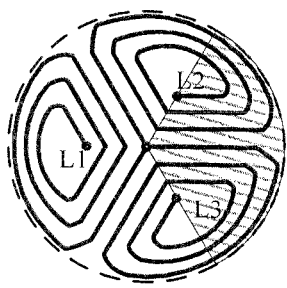 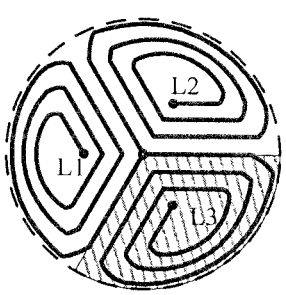 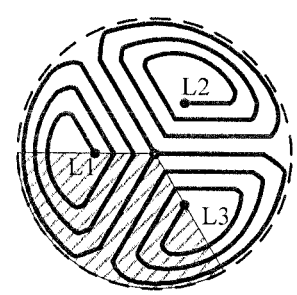
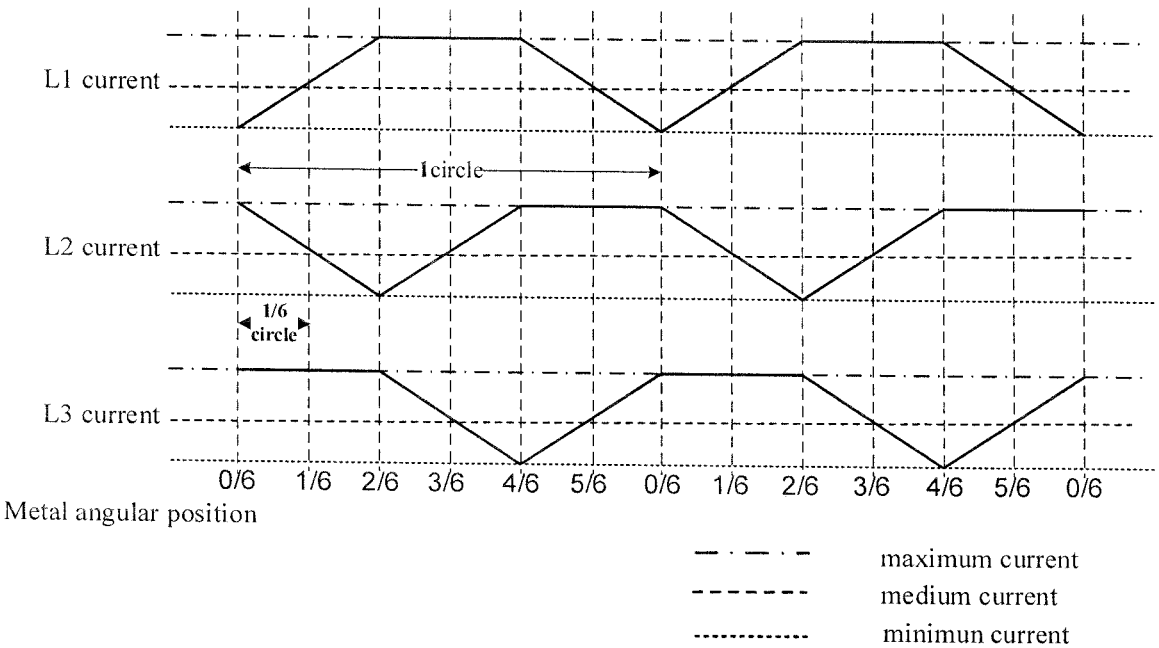
Figure 6 – Coil Currents During Clockwise Rotation

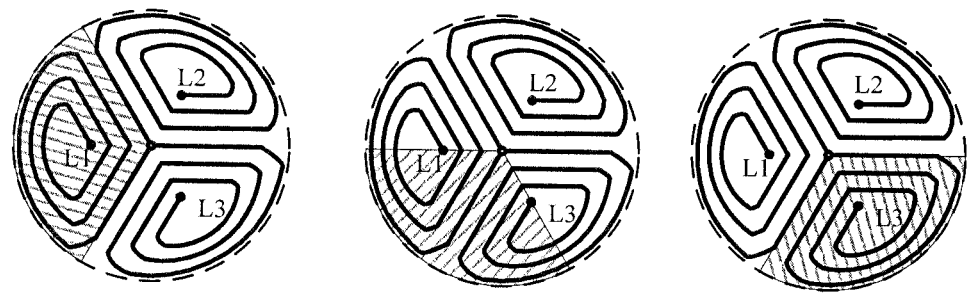
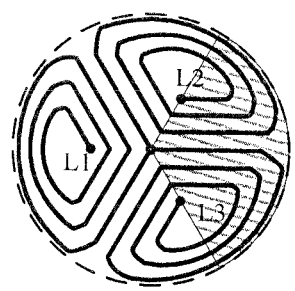 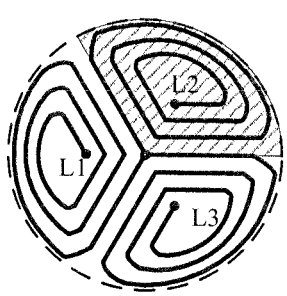 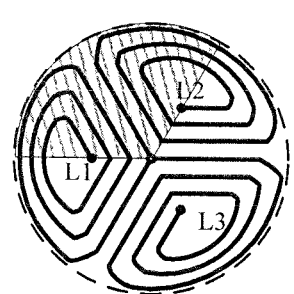
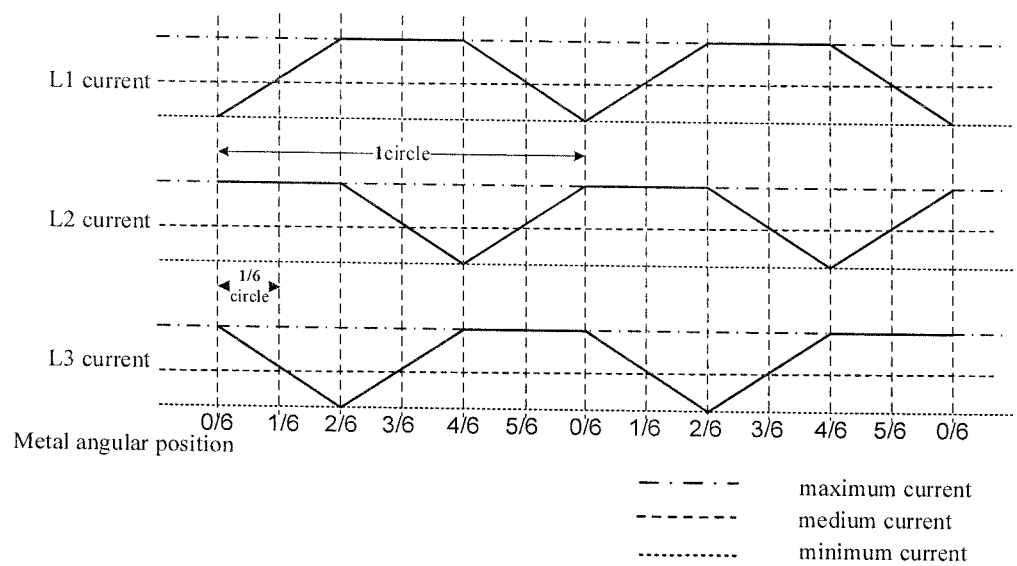
Figure 7 – Coil Currents During Counter-Clockwise Rotation

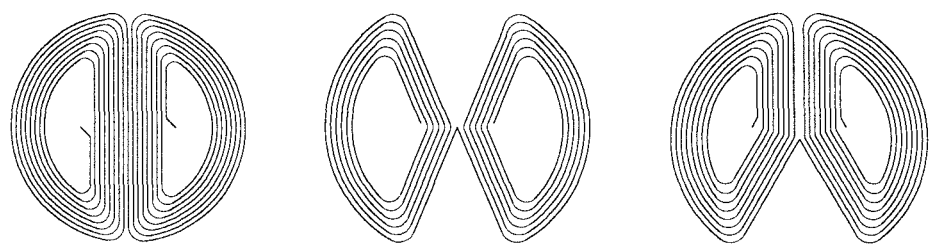
Coil shapes and sizes for 2-Coil Array
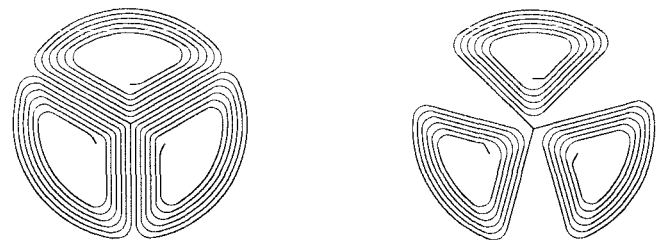
Coil shapes and sizes for 3-Coil Array
Figure 10 – Coil Shapes and Sizes

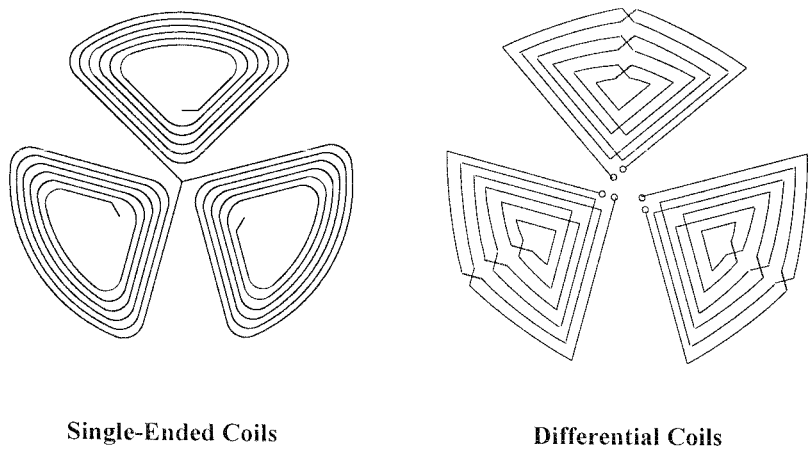
Figure 11 – Single-Ended and Differential Coils

ANGULAR DISPLACEMENT SENSOR

CROSS REFERENCE TO RELATED APPLICATION

This application claims the benefit of U.S. Provisional Patent Application Ser. No. 63/089,421, entitled "ANGULAR DISPLACEMENT SENSOR," filed Oct. 8, 2020, which is incorporated herein by reference.

BACKGROUND OF THE INVENTION

1. Field of the Invention

The invention relates to angular displacement sensors.

2. Description of the Related Art

An angular displacement sensor detects the rate of rotation of a rotating part that rotates based on the flow of a fluid, allowing for electronic processing of the information to measure the flow rate of the fluid. An example of such a sensor is disclosed in U.S. Patent Application Publication No. 2008/0164869, which consists of 5 inductors—one primary inductor with 4 secondary inductors embedded inside the primary inductor—to form an angular position detection system. In accordance with the sensor of the '869 publication the large primary coil is always the excited coil and the four small secondary coils are always the induced coils.

SUMMARY

According to a first aspect there may be provided an eddy-current angular displacement sensor offering improved sensitivity, fraud resistance, simplicity, and cost-effectiveness. The eddy-current angular displacement sensor includes a stator including a coil array including N identical coils symmetrically arranged on the stator, wherein N is an integer greater than 1, an exciting circuit connected to the coil array, a measuring circuit connected to the coil array, and a partially metalized rotor.

In some embodiments the coil array is a microstrip metal trace.

In some embodiments the coils are single-ended coils.

In some embodiments the coils are differential coils.

In some embodiments the partially metalized rotor includes a partially metalized rotor disk that rotates around an axis of revolution A.

In some embodiments the rotor disk includes a metalized zone treated with a metal coating of a non-ferromagnetic metal.

In some embodiments the rotor disk includes a nonmetallic zone.

In some embodiments the stator includes 3 coils arranged symmetrically around the axis of revolution A.

In some embodiments the coils are on a surface of the stator closest to the partially metalized rotor.

In some embodiments the coils are formed on a printed circuit board.

In some embodiments the exciting circuit is an oscillator or a pulse generator.

In some embodiments the measuring circuits measures signal characteristics including current and voltage amplitude, inductance, frequency, quality factor, and damping factor.

In some embodiments the measuring circuit includes current or voltage amplifiers which amplify induced current or voltage amplitude in at least one induced coil, and a comparator which compares the current or voltage amplitude of the induced signals in order to determine the position of the metalized zone of the partially metalized rotor.

In some embodiments the measuring circuit includes current or voltage amplifiers which amplify induced current or voltage amplitude in at least one induced coil, and frequency counters to measure the frequency of the induced signals, wherein the frequency difference of the induced signals is used to determine the position of the metalized zone of the partially metalized rotor.

In some embodiments the exciting circuit and the measuring circuit are connected to the coils via a switching system.

In some embodiments the switching systems provides for time-division switching.

BRIEF DESCRIPTION OF THE DRAWINGS

FIGS. 6 and 7 are graphical representations of the operation of the present eddy-current angular displacement sensor when measuring the coils.

FIG. 10 shows various 2 and 3 coil designs that may be employed in accordance with the present invention.

FIG. 11 is a schematic showing alternate coil arrangements.

DETAILED DESCRIPTION

The detailed embodiments are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Referring to FIGS. 1 to 11, embodiments of an eddy-current angular displacement sensor 10 for measuring angular displacement are disclosed. The present eddy-current angular displacement sensor 10 is more sensitive to the rotation of a target, more resistant to fraud attempts, and simpler and more economical compared to currently existing sensors. It should be noted that similar references numerals are used in the disclosure of the various embodiments presented below.

Figure 1:
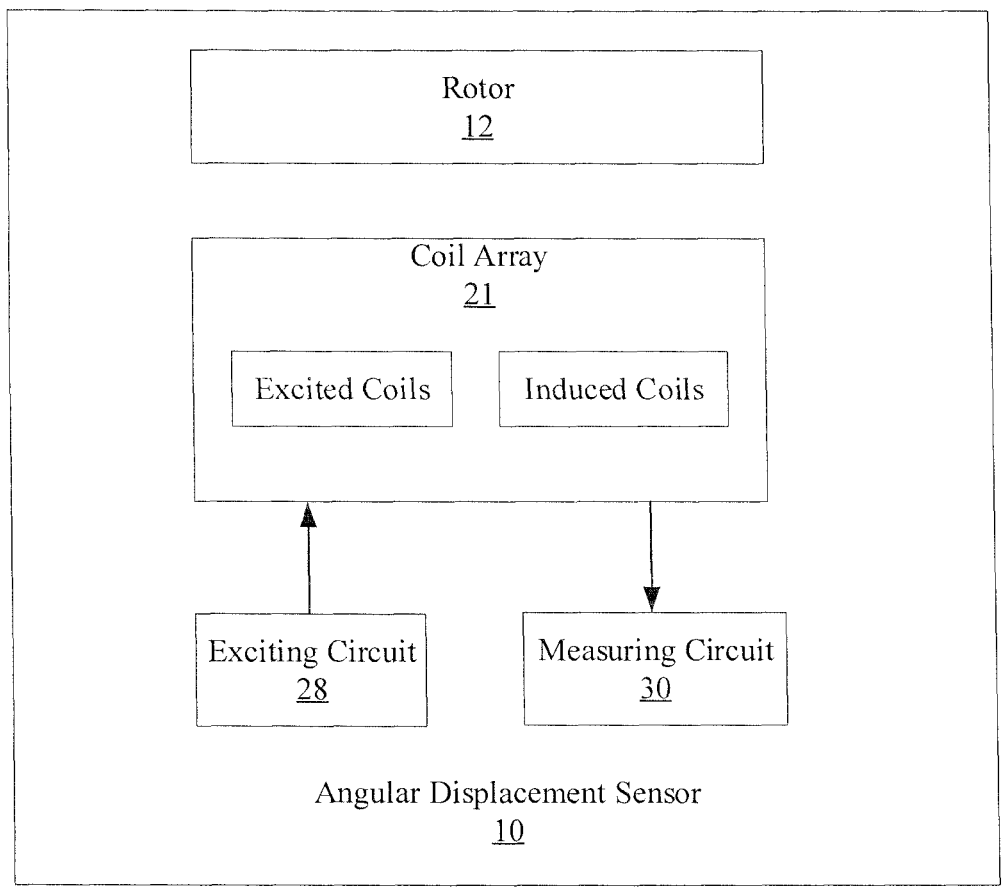
FIG. 1 is a schematic showing the system architecture of the present eddy-current angular displacement sensor.

Referring to FIG. 1, the eddy-current angular displacement sensor 10 includes exciting circuit 28, measuring circuit 30, coil array 21, and a partially metalized rotor 12. Both the exciting circuit 28 and the measuring circuit 30 are connected to the coil array 21. The coil array 21 includes N coils (where N is an integer greater than 1). The rotor 12 is usually placed either underneath or above the coil array 21. The exciting circuit 28 and the measuring circuit 30 are usually implemented on a printed circuit board (PCB) using off-the-shelf circuit components or application specific integrated circuits (ASICs). The coil array 21 is preferably implemented using microstrip metal trace to form single-ended or differential coils on a printed circuit board (PCB), along with the exciting circuit 28 and the measuring circuit 30 as shown in FIG. 11.

Figure 2:
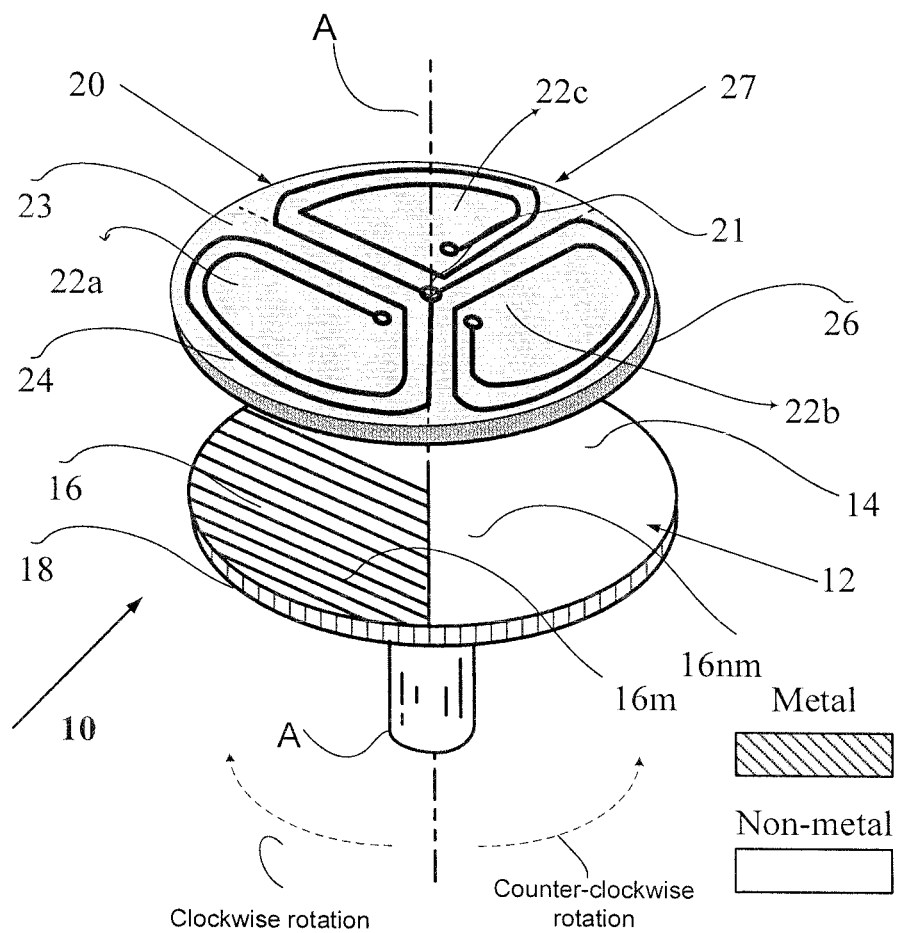
FIG. 2 is perspective view of an eddy-current angular displacement sensor in accordance with an embodiment of the present invention.
Figure 2A:
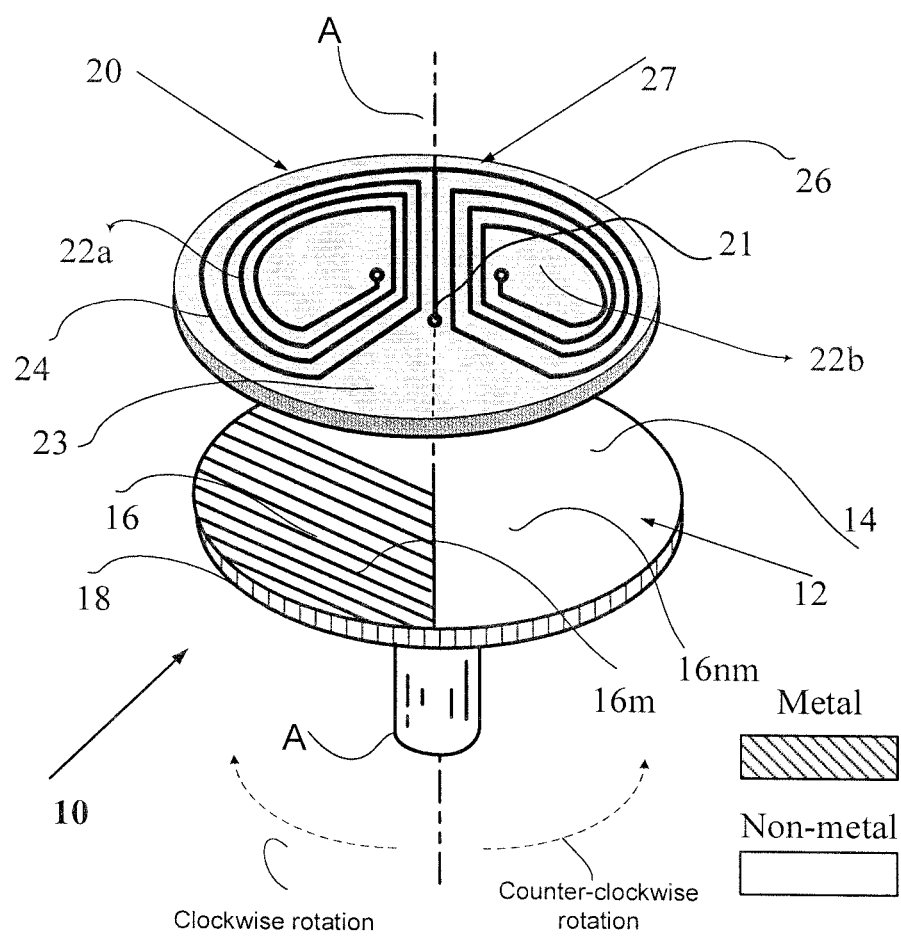
FIG. 2A is a perspective view of an eddy-current angular displacement sensor in accordance with another embodiment of the present invention.
Figure 3:
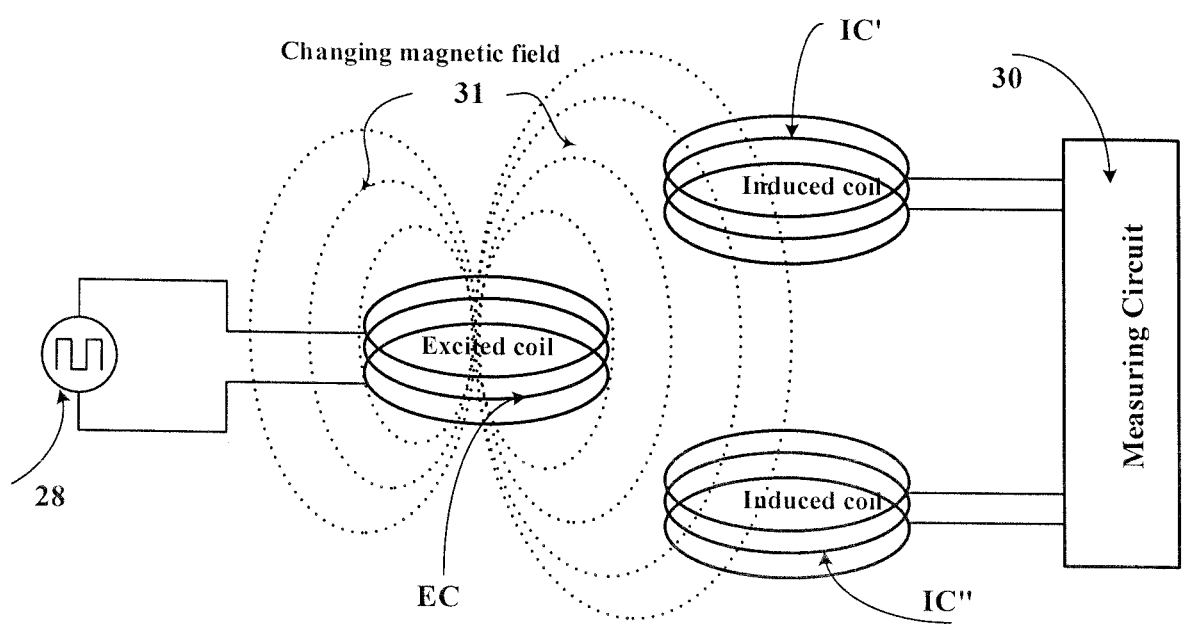
FIG. 3 is a schematic showing operation of the present eddy-current sensor.

Referring to FIGS. 2 and 2A, the eddy-current angular displacement sensor 10 includes the partially metalized rotor 12 and the stator 20. The partially metalized rotor 12 is composed of a partially metalized rotor disk 14 that rotates around its axis of revolution A. The disclosed rotor disk 14 includes an upper surface 16 and a lower surface 18 wherein a metalized zone 16m of the upper surface 16 is treated with a metal coating of a non-ferromagnetic metal, for example, aluminum, copper, gold, etc. Aluminum is preferred due to its low cost and light weight. A nonmetallic zone (or half) 16nm of the upper surface 16 defines the remaining portion of the upper surface 16 of the rotor disk 14.

The metalized zone 16m of the upper surface 16 can be constructed in various ways, e.g., as a coating layer, as a sandwiched layer, or as a whole part of the disk (e.g. half part or one-third part). In order to allow for the present eddy-current angular displacement sensor 10 to function as desired, it is only necessary to provide the rotor 12 with some metal in or on the rotor disk 14. In addition, it is appreciated the metalized zone 16m may be configured in various ways. For example, and in accordance with the disclosed embodiments, the metalized zone 16m is preferably identical or close to the shape of one coil 22a, 22b, 22c in the coil array 21 of the stator 20. For the 3-coil array disclosed with reference to FIG. 2, the metalized zone 16m is close to a 120-degree sector or one-third of the surface of the rotor disk 14 and for the 2-coil array disclosed with reference to FIG. 2A, the metalized zone 16m is close to a 180-degree sector or half of the surface of the rotor disk 14.

As briefly mentioned above, the eddy-current angular displacement sensor 10 also includes a stator 20. The stator 20 includes a planar coil array 21 consisting of N coils (where N is an integer greater than 1) 22a, 22b, (and 22c in the case of the three-coil embodiment of FIG. 2). In accordance with one disclosed embodiment as shown with reference to FIG. 2, the stator 20 includes 3 coils 22a, 22b, 22c arranged symmetrically around the axis of revolution A and the coils are identical to each other. However, and as shown with reference to FIG. 2A, the stator 20 may include only 2 coils. FIG. 10 shows various coil designs for both the 3-coil embodiment and the 2-coil embodiment.

The N identical coils are symmetrically positioned relative to the axis of revolution of the rotor 12. For a given coil array area, any one coil in the eddy current angular displacement sensor 10 has a relatively large area (compared to the coils, for example, as disclosed in US Patent Application Publication No. 2008/0164869). The larger coil area means further detection distance. Ideally, N is usually 2 or 3 (see FIGS. 2 and 2A) as this will produce optimal results as the detection distance is increased. Where N>4 this benefit is diminished although the eddy-current angular displacement sensor 10 would still function. This results in an eddy-current angular displacement sensor 10 that is simpler, more economical, more sensitive, and provides for better detection.

In accordance with a disclosed embodiment, the stator 20 is composed of a stator disk 23 and is positioned parallel to and in close proximity with the rotor disk 14. As with the rotor 12, the stator 20 includes an upper surface 24 and lower surface 26. While the coils 22a, 22b, 22c are disclosed on the upper surface 24, it is appreciated the coils can be laid out on the upper surface 24, the lower surface 26, or the middle layer of the stator disk 23. However, ideally the coils 22a, 22b, 22c are laid out on the surface closest to the rotor disk 14. For example, if the stator is above the rotor, the coils would be on the bottom surface of the stator so as to face the rotor; if the stator is underneath the rotor, the coils would be on the upper surface of the stator. The closer the distance between the metalized zone 16m of the rotor disk 14 and the coils 22a, 22b, 22c, the better the detection of the angular displacement. In accordance with a disclosed embodiment, the stator 20, and ultimately the coils 22a, 22b, 22c of the stator 20, are positioned above the rotor 12, although as discussed above it is appreciated the stator and its coils may be placed either underneath or above the rotating rotor disk of the rotor 12.

In accordance with a disclosed embodiment, the coils 22a, 22b, 22c are formed on a printed circuit board (PCB) 27, which functions as the stator 20, whereby the coils 22a, 22b, 22c are arranged in a radially symmetrical setup relative to the axis of revolution A.

The eddy-current displacement sensor 10 further includes an exciting circuit 28 and a measuring circuit 30. In accordance with the embodiment disclosed with reference to FIG. 3, the exciting circuit 28 is an oscillator or a pulse generator, which is connected to one of the coils 22a, 22b, 22c and the measuring circuit 30 is connected to the other coil(s) 22a, 22b, 22c. Each coil 22a, 22b, 22c can be connected to the exciting circuit 28 and excited by an oscillating signal or a pulse signal to generate a changing magnetic field 31, thus acting as the excited coil EC. The other coils are then induced by the magnetic field 31 and act as the induced coil(s) IC', IC" For any coil in the coil array, either the induced coil or the excited coil, its signal characteristics, such as current and voltage amplitude, inductance, frequency, quality factor, and damping factor, vary significantly depending on whether or not the metalized zone 16m of the rotor 12 is beneath it, through which travel the eddy currents generated by the changing magnetic field 31. The measuring circuit 30 is connected to the induced coils IC', IC" to measure these variations and as such incorporates known circuitry for measuring signal characteristics, such as current and voltage amplitude, inductance, frequency, quality factor, and damping factor. The results are then analyzed to determine the position of the metalized zone 16m of the rotor 12, the angular displacement of the rotating rotor disk 14, and finally the flow rate of the fluid.

In accordance with a contemplated embodiment where the eddy-current angular displacement sensor 10 is used in a water supply system, the rotor is pushed by the water flow in the water pipe and the rotor's speed is proportional to the water flow rate. The flow rate can be calculated using measurements of angular displacement of the rotor and time data due to this property. With this in mind, the manner in which the fluid interacts with the rotor may be achieved in a variety of well-known manners, for example, propellers linked to the rotor that cause rotation thereof.

Figure 4:
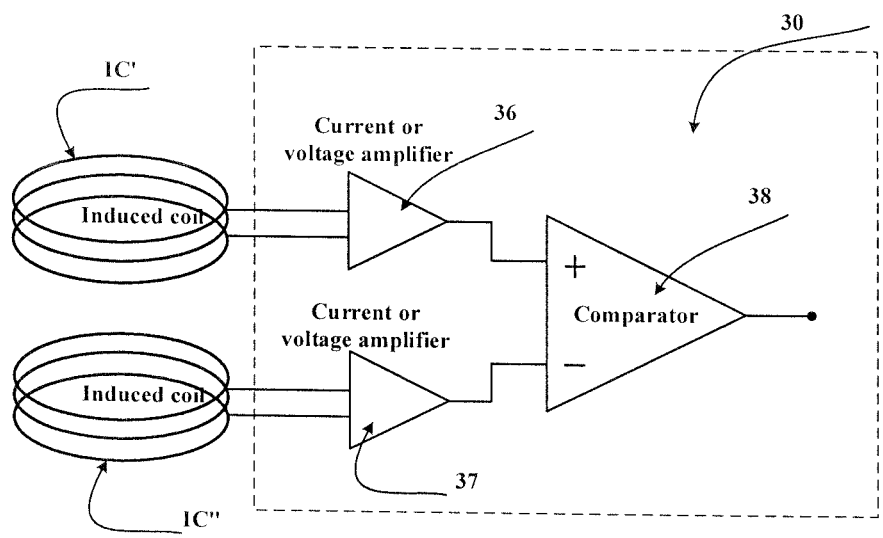
FIG. 4 is a circuit diagram of an embodiment of a measurement circuit.
Figure 5:
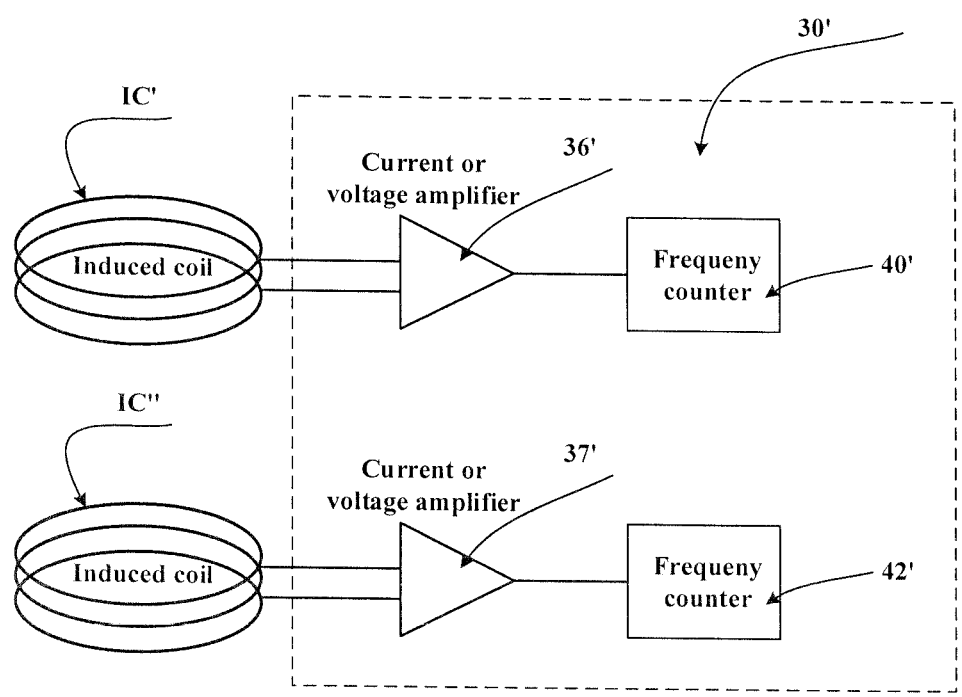
FIG. 5 is a circuit diagram of another embodiment of a measurement circuit.

One example of the measuring circuit 30 is shown in FIG. 4, which is used to measure the induced current or voltage amplitude in the induced coils IC', IC". The measuring circuit 30 includes current or voltage amplifiers 36, 37 which amplify the induced current or voltage amplitude in the induced coil(s) IC', IC", and a comparator 38, which compares the current or voltage amplitude of the induced signals in order to determine the position of the metalized zone 16m of the rotor 12. Another example of the measuring circuit 30' is shown in FIG. 5, where the comparator is replaced with frequency counters 40', 42' to measure the frequency of the induced signals. The frequency difference of the induced signals can then be used to determine the position of the metalized zone 16m of the rotor 12. Other examples of the measuring circuit might employ any circuit which can measure the difference in inductance and/or quality factor/damping factor of the induced signals for detection of the position of the metalized zone 16m of the rotor 12.

FIG. 6 and FIG. 7 show the induced current characteristics of each induced coil IC', IC" against the location of the metalized zone 16m of the rotor 12. The induced current at each induced coil IC', IC" changes periodically with the rotation of the metalized zone 16m of the rotor 12. FIG. 6 depicts the clockwise rotation of the metalized zone 16m of the rotor 12, while FIG. 7 depicts the counterclockwise rotation. With time measurement, it is possible to determine the speed and direction of the rotation from the angular displacement of the metalized zone 16m of the rotor 12 and rotating rotor disk 14 and therefore the flow rate and flow direction of the fluid. It should be appreciated, the excited current characteristics resulting in the excited coil(s) also change periodically with the rotation of the metalized zone 16m of the rotor 12 as discussed in further detail herein.

An example of a measuring method is to excite the excited coil EC periodically and measure the induced signals in induced coils IC', IC". By combining the measurements with time, it is possible to detect the flow rate and direction of the fluid. In accordance with another embodiment, each of the coils 22a, 22b, 22c is excited at different points in time. This may be accomplished, for example, by a system such as disclosed below with reference to FIG. 8. In accordance with such an embodiment at time t1, coil 22a is excited and the induced signals in coils 22b, 22c are measured, then the measurements are compared to determine the location of the metalized zone 16m of the rotor 12 at time t1; at time t2, coil 22b is excited and the induced signals at coils 22a, 22c are measured, then the measurements are compared to determine the location of the metalized zone 16m of the rotor 12 at time t2; at time t3, coil 22c is excited and the induced signals at coils 22a, 22b are measured, then the measurements are compared to determine the location of the metalized zone 16m of the rotor 12 at time t3. By combining 3 measurements with time information, one skilled in the art may use well-known calculation techniques to compute the speed and direction of the rotation of the metalized zone 16m of the rotor 12.

Cycling through the coils periodically, as disclosed above, gives continuous detection of the flow rate and flow direction of the fluid. For example, and considering the 3-coil array, at time t0, the currents in 3 coils are measured. By comparing the measured currents in 3 coils, one can determine the metal angular location (assuming the measuring speed is much faster than the metal rotating speed, so the metal moves very little during measurement). After a period of time Δt, the currents in 3 coils are measured again, the measurement results are compared, and the new angular location is determined. Here, Δt must be less than half of the shortest rotation period of the metal (Nyquist Sampling Theory). Dividing the angular displacement, measured in 60 degrees, or sixths of a full rotation, by Δt, the rotation speed of the metal is obtained, which is proportional to the fluid flow rate. The fluid flow rate equals the rotation speed multiplied by the circumference of the rotor.

In accordance with a further embodiment, and as briefly discussed above, it is noted that the disclosure above discusses measuring the signals in the induced coils and using the measured signals to determine angular displacement. However, it is also possible to measure the signal of the excited coil in making calculations regarding angular displacement. In particular, the partially metalized nature of the rotor will have an effect upon the signal passing through the excited coil and the change in the signal may be used in determining the angular displacement and ultimately the flow of fluid.

FIG. 6 and FIG. 7 demonstrate the effects of the partially metalized rotor caused by the eddy current traveling through the metal. The effects are the same for the excited coils or the induced coils. The only difference is that in the excited coils, the effect is much more significant, and thus the excited coil is preferred for measuring due to better detection of the angular displacement. In contrast, and with reference to U.S. Patent Application Publication No. 2008/0164869, the measurements can only be done in the four secondary coils (the induced coils). In accordance with the present eddy-current displacement sensor 10, the measurements can be done in the induced coils, the excited coils, or all of the coils by time-division switching the measuring circuit to the coils as shown with reference to FIG. 8.

Figure 8:
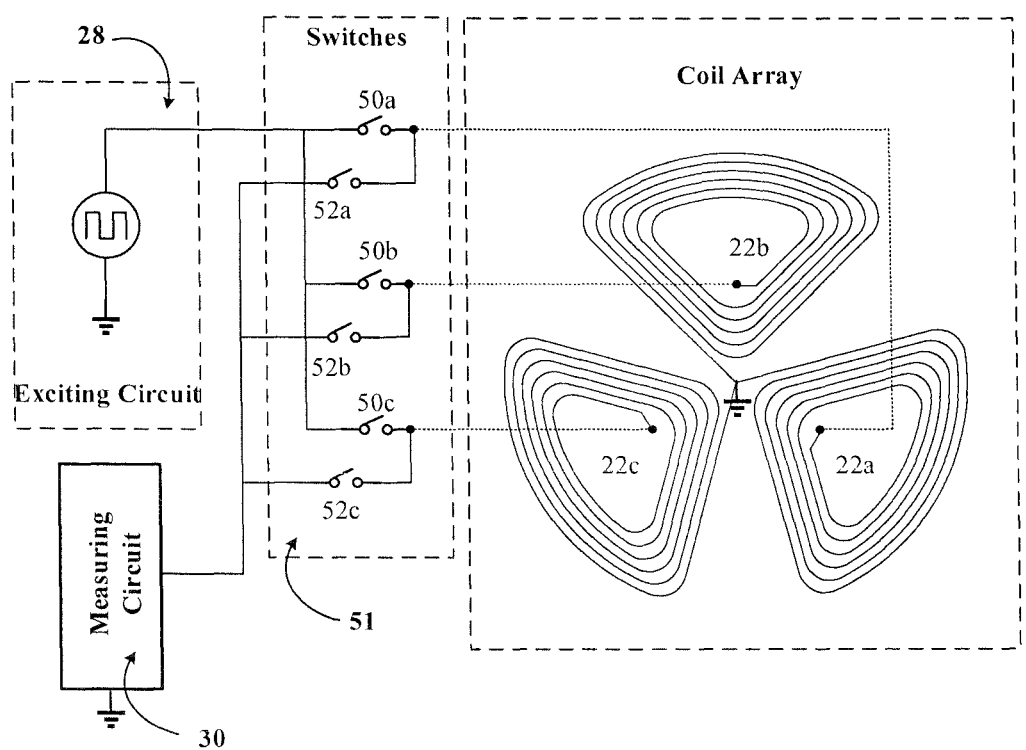
FIG. 8 is a circuit diagram showing an exciting circuit and measurement circuit for the eddy-current angular displacement sensor in accordance with an embodiment of the invention.

In accordance with a more elaborate excitation and measuring system as shown in FIG. 8, both of the exciting circuit 28 and the measuring circuit 30 are connected to one or more of the coils 22a, 22b, 22c via a switching system 51 composed of switches 50a, 50b, 50c, 52a, 52b, 52c. As shown in the FIG. 8, switch 50a connects the exciting circuit 28 to coil 22a, switch 50b connects the exciting circuit 28 to coil 22b, switch 50c connects the exciting circuit 28 to coil 22c. Similarly, switch 52a connects the measuring circuit 30 to coil 22a, switch 52b connects the measuring circuit 30 to coil 22b, switch 52c connects the measuring circuit 30 to coil 22c. The connections can then be changed by controlling the switches 50a, 50b, 50c, 52a, 52b, 52c, for example, as discussed below. Any coil 22a, 22b, 22c in the coil array 21 can alter between acting as the excited coil EC and acting as the induced coil IC', IC" by time-division switching the exciting circuit 28 to the coils 22a, 22b, 22c by actuating switches 50a, 50b, 50c. Further, selected coils 22a, 22b, 22c may be measured by the measuring circuit 30 by actuating switches 52a, 52b, 52c. This allows for measurement of excited coils and/or induced coils.

Figure 9:
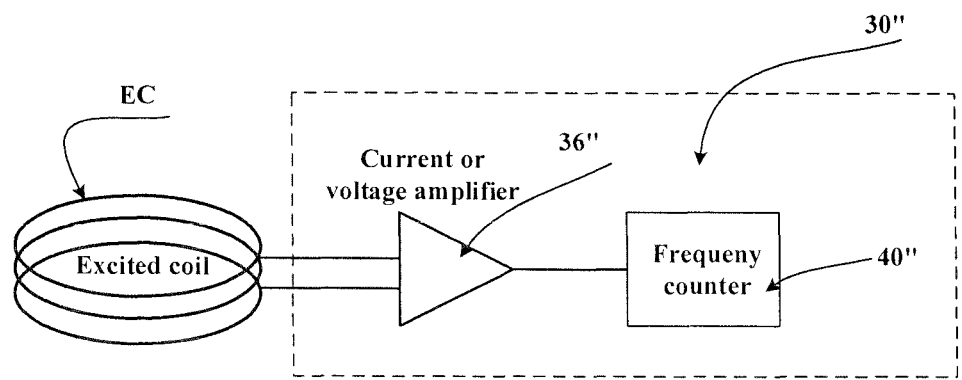
FIG. 9 is a schematic of another embodiment of a measurement circuit.

In accordance with such an embodiment, a measuring circuit 30" such as disclosed in FIG. 9 may be used wherein the previously discussed comparator is replaced with a frequency counter 40" to measure the frequency of the signal in the excited coil EC. The frequency difference of the excited coil at different time can then be used to determine the position of the metalized zone 16m. Also, measuring circuits such as disclosed in FIG. 4 may be used, as may other measuring circuits providing accurate information.

For example, at time t1, switch the exciting circuit 28 to coil 22a via switch 50a. Coil 22a is acting as the excited coil EC and coils 22b, 22c act as the induced coils IC', IC" and either of the coils may be measured via switches 52a, 52b, 52c. At time t2, switch the exciting circuit 28 to coil 22b via switch 50b. Coil 22b is acting as the excited coil EC and coils 22a, 22c act as the induced coils IC', IC" and either of the coils may be measured via switches 52a, 52b, 52c. At time t3, switch the exciting circuit 28 to coil 22c via switch 50c. Coil 22c is acting as the excited coil EC and coils 22a, 22b act as the induced coils IC', IC" and either of the coils may be measured via switches 52a, 52b, 52c. As a result, the measuring circuit 30 can connect to the induced coils IC', IC", the excited coils EC, or all of the coils by time-division switching the measuring circuit 30 to the coils 22a, 22b, 22c via switches 52a, 52b, 52c.

For example, at time t1, one may switch both the exciting circuit 28 and the measuring circuit 30 to coil 22a and measure the electrical characteristics of coil 22a; at time t2, one may switch both the exciting circuit 28 and the measuring circuit 30 to coil 22b and measure the electrical characteristics of coil 22b; at time t3, one may switch both the exciting circuit 28 and the measuring circuit 30 to coil 22c and measure the electrical characteristics of coil 22c. The above time-division switching may be repeated for continuous measurement. Combining the measurements with time, one can then compute (for example, via a computer-based calculation system) the speed and direction of the rotation of the metalized zone 16m, and thus the flow rate and flow direction of the fluid.

By using time-division switching as discussed above, the eddy-current displacement sensor 10 is immune to manufacturing and installation variations or imperfections, is more resistant to outside interferences, and achieves better detection accuracy.

In summary the present invention provides an improved scheme of exciting and measuring coils, and the related circuitry. As shown by way of the embodiment disclosed with reference to FIG. 3, the connection between the exciting circuit and the coil can be fixed, and so can the connection between the measuring circuit and the coil. Furthermore, and in accordance with embodiment disclosed with reference to FIG. 8, any coil in the coil array can alter between acting as the excited coil and acting as the induced coil by time-division switching the exciting circuit to the various coils.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. An eddy-current angular displacement sensor offering improved sensitivity, fraud resistance, simplicity, and cost-effectiveness, comprising:
    a stator including a coil array including N identical coils symmetrically arranged on the stator, wherein N is an integer greater than 1;
    an exciting circuit connected to the coil array;
    a measuring circuit connected to the coil array;
    a switching system connecting the exciting circuit and the measuring circuit to the coils of the coil array, the switching system includes a plurality of switches connecting the exciting circuit to the N identical coils and the switching system includes a plurality of switches connecting the measuring circuit to the N identical coils, wherein each of the plurality of switches connecting the exciting circuit to the N identical coils and the switching system connects the exciting circuit to a specific one of the N identical coils, and each of the plurality of switches connecting the measuring circuit to the N identical coils and the switching system connects the measuring circuit to a specific one of the N identical coils; and
    a partially metalized rotor.

2. The angular displacement sensor according to claim 1, wherein the coil array is a microstrip metal trace.

3. The angular displacement sensor according to claim 1, wherein the coils are single-ended coils.

4. The angular displacement sensor according to claim 1, wherein the coils are differential coils.

5. The angular displacement sensor according to claim 1, wherein the rotor includes a partially metalized rotor disk that rotates around an axis of revolution A.

6. The angular displacement sensor according to claim 5, wherein the partially metalized rotor disk includes a metalized zone treated with a metal coating of a non-ferromagnetic metal.

7. The angular displacement sensor according to claim 6, wherein the partially metalized rotor disk includes a non-metallic zone.

8. The angular displacement sensor according to claim 7, wherein the stator includes 3 coils arranged symmetrically around the axis of revolution A.

9. The angular displacement sensor according to claim 1, wherein the coils are on a surface of the stator closest to the partially metalized rotor.

10. The angular displacement sensor according to claim 1, wherein the coils are formed on a printed circuit board.

11. The angular displacement sensor according to claim 1, wherein the exciting circuit is an oscillator or a pulse generator.

12. The angular displacement sensor according to claim 1, wherein the measuring circuit measures signal characteristics including current and voltage amplitude, inductance, frequency, quality factor, and damping factor.

13. The angular displacement sensor according to claim 1, wherein the measuring circuit includes current or voltage amplifiers which amplify induced current or voltage amplitude in at least one induced coil of the coil array, and a comparator which compares the current or voltage amplitude of the induced signals in order to determine a position of a metalized zone of the partially metalized rotor.

14. The angular displacement sensor according to claim 1, wherein the measuring circuit includes current or voltage amplifiers which amplify induced current or voltage amplitude in at least one induced coil of the coil array, and frequency counters to measure the frequency of the induced signals, wherein a frequency difference of the induced signals is used to determine a position of a metalized zone of the partially metalized rotor.

15. The angular displacement sensor according to claim 1, wherein the switching system provides for time-division switching.

* * * * *